US009330405B2

(12) United States Patent
Kwan (10) Patent No.: US 9,330,405 B2
(45) Date of Patent: May 3, 2016

(54) METHODS AND APPARATUS FOR FAST ITEM IDENTIFICATION

(71) Applicant: Sik Piu Kwan, Suwanee, GA (US)

(72) Inventor: Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 449 days.

(21) Appl. No.: 13/790,001

(22) Filed: Mar. 8, 2013

(65) Prior Publication Data

US 2014/0258317 A1 Sep. 11, 2014

(51) Int. Cl.
*G06F 17/30* (2006.01)
*G06Q 30/06* (2012.01)

(52) U.S. Cl.
CPC .......... *G06Q 30/06* (2013.01); *G06F 17/30725* (2013.01)

(58) Field of Classification Search
CPC ................................................ G06F 17/30725
See application file for complete search history.

(56) References Cited

U.S. PATENT DOCUMENTS

| 6,032,517 A * | 3/2000 | Reisig et al. ...................... 73/78 |
| 8,061,603 B2 | 11/2011 | Connell, II et al. |
| 2002/0003166 A1* | 1/2002 | Miller et al. ............. 235/462.13 |
| 2006/0151604 A1* | 7/2006 | Zhu et al. ....................... 235/454 |
| 2011/0105017 A1* | 5/2011 | Takada et al. .................. 455/18 |
| 2013/0223673 A1* | 8/2013 | Davis et al. ................... 382/100 |

FOREIGN PATENT DOCUMENTS

| JP | 2002117457 A * | 4/2002 |
| WO | 03/005313 | 1/2003 |
| WO | 2008/026108 | 3/2008 |

* cited by examiner

*Primary Examiner* — Kris Mackes
(74) *Attorney, Agent, or Firm* — Harden E. Stevens, III; Schwegman, Lundberg & Woessner (57) ABSTRACT

Methods and apparatus are provided for fast item identification. A plurality of sensors capture data for an unknown item that is moved past the sensors. The data is processed to produce a plurality of physical attributes related to the unknown item. The physical attributes are used to search a database of physical attributes for a large number of known items where the unknown item is one of the known items. A small set of known items are selected where the physical attributes of the known items match the physical attributes of the unknown item. Further processing of the selected set of known items identifies the unknown item as one of the set of known items.

17 Claims, 5 Drawing Sheets

| ID | ATTRIBUTE | MEASUREMENT | NUMBER OF BITS |
|---|---|---|---|
| 1 | METALLIC | METALLIC OR NON-METALLIC | 1 |
| 2 | SHAPE | BOX, CYLINDER, OVAL, OTHER | 2 |
| 3 | RIGIDITY | SOFT, SEMI-SOFT, HARD | 2 |
| 4 | TEMPERATURE | FROZEN, REFRIGERATED, ROOM TEMPERATURE, HOT | 2 |
| 5 | WEIGHT | 1/2 OUNCE INCREMENTS | 10 |
| 6 | SIZE | L x W x H (1/2 INCH INCREMENTS) | 15 |
| 7 | COLOR PROFILE | 8 COLOR CHANNELS | 8 |

METHODS AND APPARATUS FOR FAST ITEM IDENTIFICATION

CROSS-REFERENCE TO RELATED APPLICATIONS

This application is related to U.S. patent application Ser. No. 13/790,042 titled "Methods and Apparatus for Low Resolution Item Identification" having the same inventorship and assignee as this application and which is hereby incorporated by reference in its entirely.

FIELD OF THE INVENTION

The present invention relates to improved apparatuses and methods for identifying items and more specifically to such apparatuses and methods used to identify items presented for identification and purchase at a point of sale terminal.

BACKGROUND

Retail stores have used point of sale terminals with optical code scanners for years to process purchase transactions. During this time, numerous methods have been developed to make fraudulent purchases using optical code scanners. The fraudulent methods include replacing the optical code used to identify an expensive item with the optical code for a lower cost item. The fraudulent methods further include sweet hearting or passing an item to the bagging area without scanning it. Attempts to mitigate the fraud include adding security scales to the bagging area of the point of sale terminal to assure the items being bagged match the item identified for purchase. However, these attempts have not eliminated the fraud. In the above case, if the lower cost item has the same weight as the expensive item, the security scale will not identify the fraud because the expected weight was placed in the bagging area.

Additional non-fraud related issues also exist. For example, the optical code that identifies an item may not be readable due to damage or because it is covered by another label, printing, or because it is missing. In these cases, a person must identify the item and enter it into the point of sale terminal. This typically increases the time required to conduct the purchase transaction.

In an attempt to solve these issues, software has been written to uniquely identify an item simply by the item's appearance instead of by using an optical code. The software identifies the item by analyzing a captured image of the item. However, analyzing the captured image requires a relatively long period of time and the data record produced by the analysis is very large, sometimes approaching 100,000 bytes. The analysis also requires a large database with information on every known item which is then used to uniquely identify an unknown item. In some implementations, the database stores data for over 100,000 known items where each database record for a known item could have between 10,000 and 100,000 bytes of data. The resulting database would require between 1 and 10 Gigabytes of data storage. If the database is located on a central server computer, between 10,000 and 100,000 bytes of the data must be transmitted from the point of sale terminal to the central server computer for each item to be identified. This process of transmitting the data to the central server computer and then processing the data to identify the item can take multiple seconds for each item. In one test using data for only 80 known items in a database, the average identification time was between two and three seconds. For a database of 100,000 items, the projected average identification time was determined to 3,651 seconds.

SUMMARY

Among its several aspects, the present invention seeks to overcome or ameliorate at least one of the disadvantages of the prior art, or to provide a useful alternative.

Therefore, among its several aspects, the present invention recognizes it would be desirable to identify an item by the appearance of the item and to only require a very small amount of data to identify each item. Using only a small amount of data to identify an item reduces the amount of data that must be stored and searched which reduces the amount of time required to identify the item. Also, identifying an item by appearance reduces fraud because an optical code is not used to identify the item.

Among its several aspects, the present invention recognizes that the time required to identify an item can be reduced by dividing the item identification process into two separate and distinct functions. The first function takes a large universe of possible identifications for the item and reduces the possible matches to a smaller set of identifications. For example, the large universe may suitably include over 100,000 records where each record has information that identifies a single item. The first function uses attributes for an unknown item to reduce the large universe down to a smaller set that may suitably have less than 10 records. One of the records in the smaller set will identify the unknown item. The bulk of the processing takes place in this function. The second function uses a different method from the first function to identify the unknown item from the remaining small set of item records.

Among its several aspects, the present invention further recognizes that a small number of physical attributes which are related to an item can be used to reduce a large number of possible identifications to a much smaller number of possible identifications. For each item to be identified, these attributes can be measured and processed in a relatively short period of time, typically in less than 1 second. For example, using this approach the number of possible identifications can quickly be reduced from as many as 100,000 to less than 10 using a database that requires less than 10 megabytes of data storage.

The universe of items that can be identified by an item scanner can include more than 100,000 items. Among its several aspects, the present invention uses an aggregate attribute generated for an unknown item and for known items to reduce the size of the universe of items to only a few items that match the attributes of the unknown item. Once the universe of items is reduced to a small set of candidate items, additional processing is performed using just the set of candidate items to determine an identity of the unknown item. In some cases, the set of candidate items has only one member so the unknown item is identified without the need for additional processing.

In accordance with an embodiment of the present invention, there is provided a method implemented by an item scanner to identify an item. The method comprising: calculating a value for each of a plurality of physical attributes related to the item using one or more of a plurality of sensors that are part of the item scanner; identifying from the plurality of physical attributes the physical attributes that have predefined categories where each predefined category is based on a predetermined range of values for the physical attribute and determining for each of the identified physical attributes the predefined category that has a range of values that include the calculated value; generating an aggregate attribute data record that includes each of the plurality of physical attributes; comparing the generated aggregate attribute data record to a plurality of the stored aggregate attribute data records for known items; and selecting a set of stored known item data records where the stored aggregate attribute data record of each selected known item data record matches the generated aggregate attribute data record.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
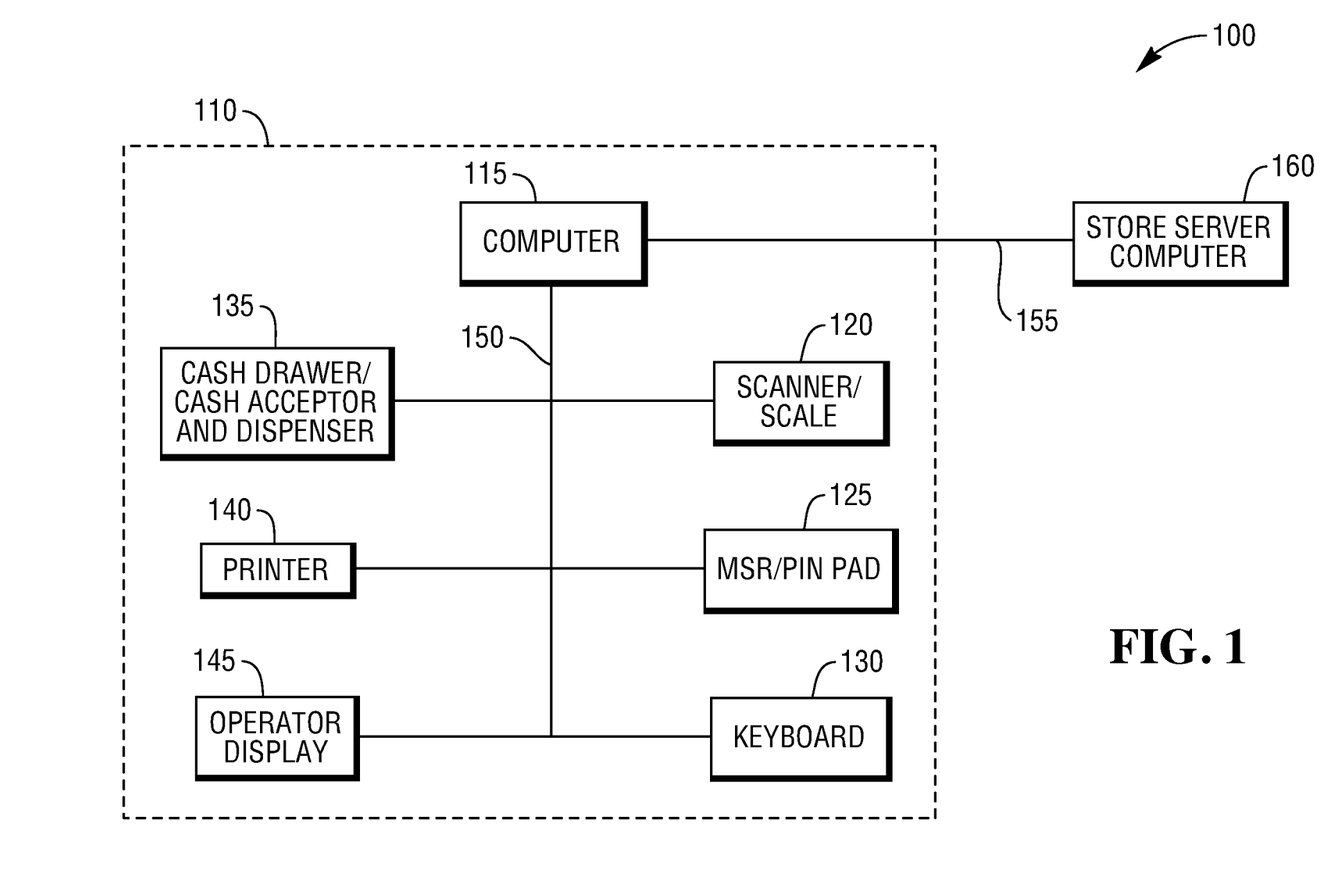
FIG. 1 is a high-level block diagram illustrating a point of sale system in accordance with the present invention.

With reference to FIG. 1, there is provided a high-level block diagram illustrating a point of sale system 100. The point of sale system 100 of the present embodiment includes a point of sale terminal 110 in communication with a store server computer 160 using a network 155. The point of sale terminal 110 performs purchase transactions by identifying one or more items presented for purchase by a customer. During the purchase transactions, the point of sale terminal 110 communicates with the store server computer 160 to send and receive data related to the purchase transactions.

Although only one point of sale terminal 110 is depicted, it should be appreciated that the point of sale system 100 supports multiple point of sale terminals 110 that use the network 155 to communicate with the store server computer 160. Additionally, it should be appreciated that the point of sale terminal 110 may suitably be embodied as an assisted point of sale terminal or a customer operated point of sale terminal. In some embodiments, the point of sale system 100 includes both assisted point of sale terminals and customer operated point of sale terminals.

The network 155 may suitably include a network which uses a communications protocol based on transmission control protocol/internet protocol (TCP/IP). The network 155 may suitably include a combination of local area and wide area networks. The network 155 may further suitably include any combination of wireless and wired networks. The wireless networks include local area wireless computer networks and cellular based data networks.

The store server computer 160 includes a processor and memory where the memory includes application software. The processor of the store server computer 160 executes the application software which causes the processor to perform features and functions that support the operations of the store. The application software provides features and functions that may suitably include support for point of sale operations, an item lookup database, sales and inventory management, personnel management and customer assistance services.

The point of sale terminal 110 suitably includes a computer 115, a scanner/scale device 120, an MSR/PIN PAD device 125, a keyboard device 130, a cash drawer/cash acceptor and dispenser 135, a printer device 140, an operator display 145 and a computer network 150. The computer network 150 may include more than one type of network, where each network is used to communicate with different devices. The computer 115 communicates with the devices over the computer network 150 which may suitably include an implementation of the industry standard Universal Serial Bus (USB). The computer network 150 may additionally include a second network designed to communicate with a display device such as the operator display 145.

The computer 115 may suitably include a personal computer designed for use within another device such as the point of sale terminal 110. In some embodiments, the computer 115 is a single board computer. The computer 115 includes a processor, memory, a network controller for controlling the external network 155 and a computer network controller for controlling the computer network 150. The memory of the computer 115 includes computer instructions that are executed by the processor of the computer 115 and which cause the processor to control the components and devices of the point of sale terminal 110 and provide the high level functions of the point of sale terminal 110. In some embodiments, the memory includes a database and instructions that operate the database.

The MSR/PIN PAD device 125 is a magnetic stripe reader and personal identification number (PIN) device. It reads information from the magnetic stripe on a card that is moved through the device. For example, the device 125 reads the magnetic stripes found on the back of credit, debit and loyalty cards plus magnetic stripes found on the back of some driver licenses. The PIN PAD allows a customer or operator to enter a personal identification number that may be associated with the card. This information is then securely transmitted to the computer over the computer network 150.

The cash drawer/cash acceptor and dispenser device 135 may suitably include just a cash drawer device or just a cash acceptor and dispenser device or both. Operator assisted embodiments of the point of sale terminal 110 may suitably include just the cash drawer device because an employee will handle the currency. Customer operated embodiments of the point of sale terminal 110 may suitably include just the cash acceptor and dispenser device which secure the currency but allow a customer to give and receive currency. In yet other embodiments, both the cash drawer device and cash acceptor and dispenser device are present. The cash drawer/cash acceptor and dispenser devices 135 communicate with and are controlled by the computer 115 using the computer network 150.

The operator display 145 includes an electronic device that displays information received from the computer 115 over the computer network 150 to a customer or operator. The operator display 145 further includes a touch screen input device that detects when and where it is being touched and sends the information to the computer 115 over the computer network 150. Some embodiments have more than one operator display 145 where one operator display 145 is used by an employee operating the point of sale terminal 110 and a second operator display 145 is used by a customer that is making a purchase.

Figure 2A:
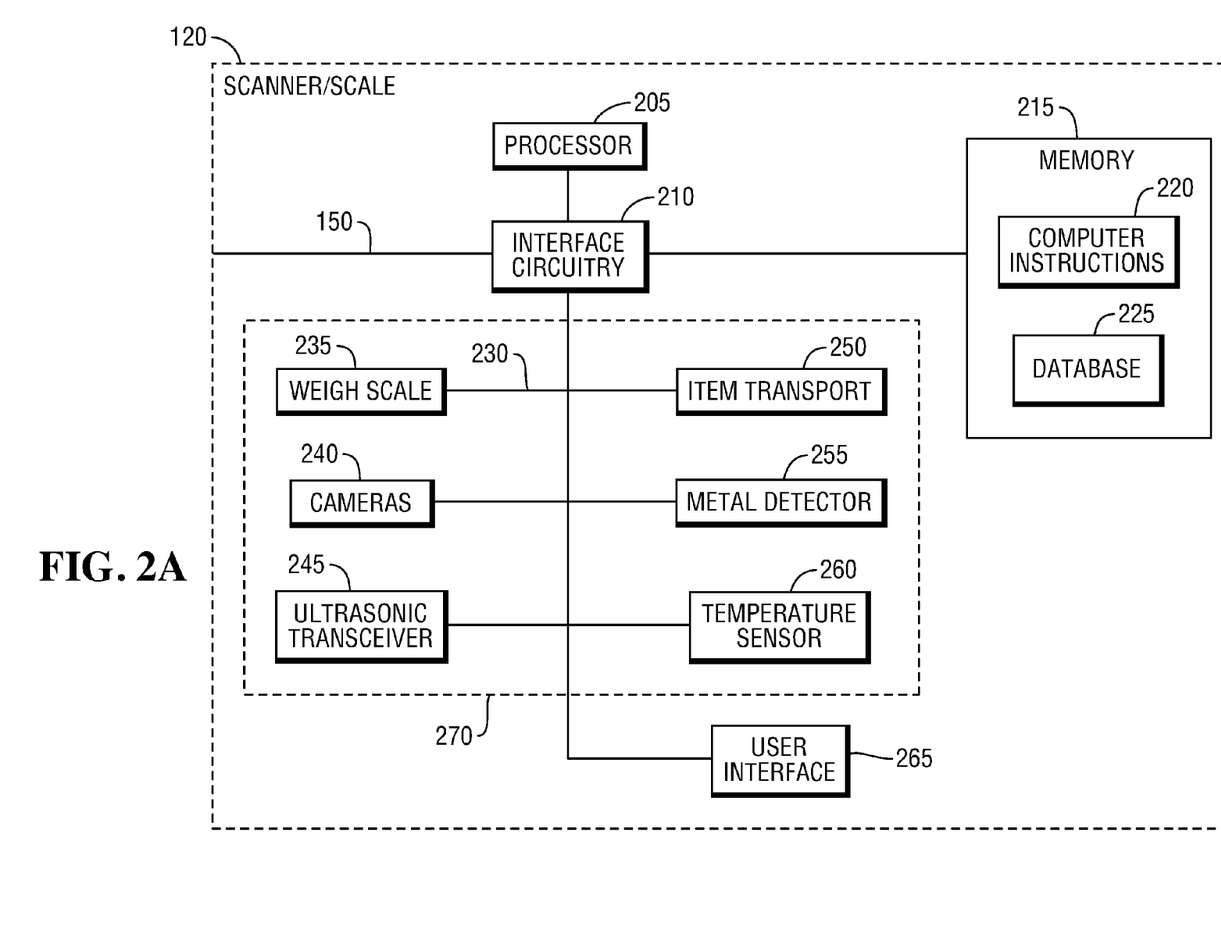
FIG. 2A is a high-level block diagram illustrating selected components of a scanner/scale.
Figure 2B:
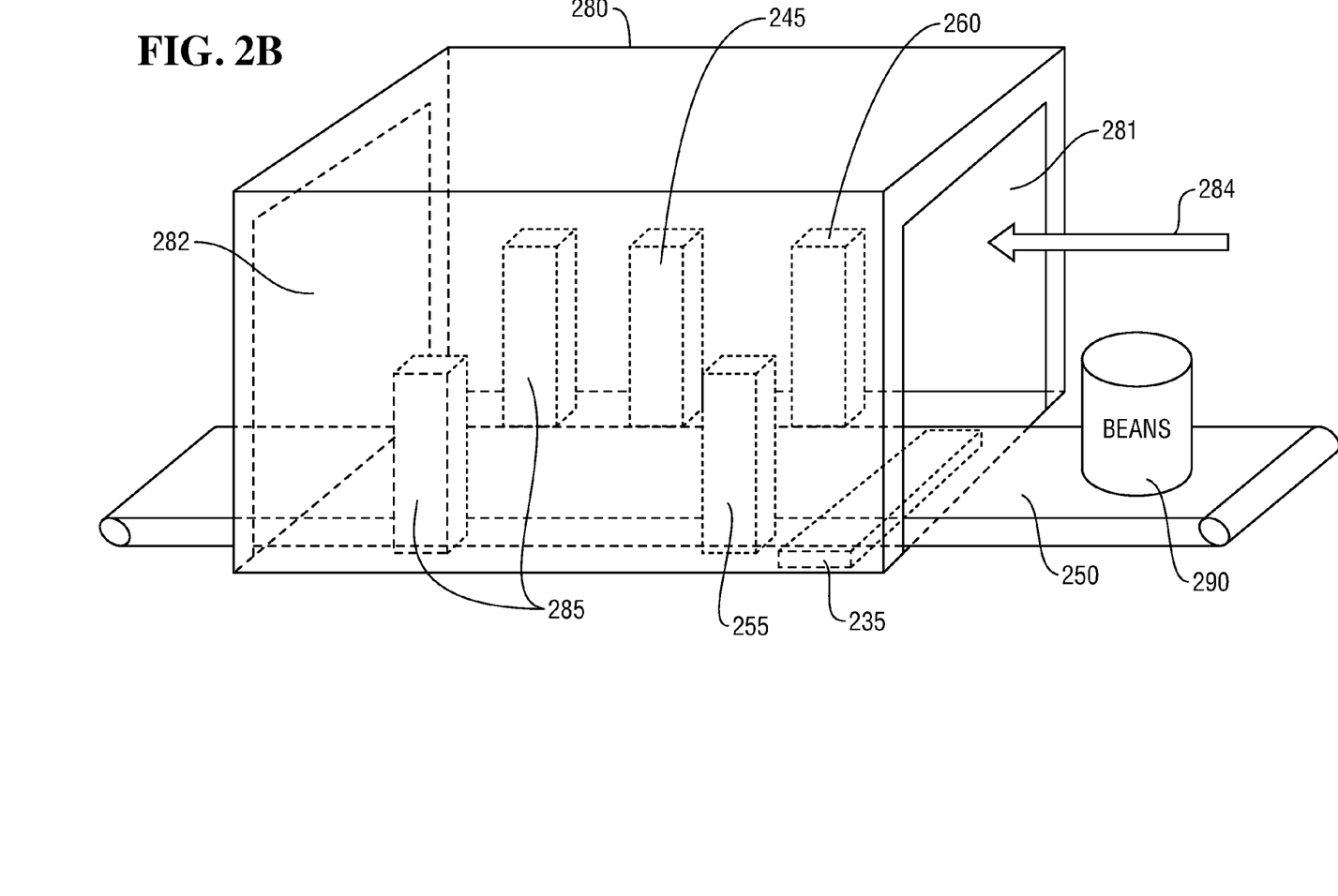
FIG. 2B is a high-level block diagram illustrating selected components of an item identification housing of the scanner/scale.

Turning now to FIGS. 2A and 2B. FIG. 2A provides a high-level block diagram illustrating selected components of the scanner/scale (scanner) 120. FIG. 2B provides a high-level block diagram illustrating selected components of an item identification housing (housing) 280 of the scanner 120. The scanner 120 identifies items presented to the scanner 120 for purchase as part of a purchase transaction being performed by the point of sale terminal 110. The scanner 120 uses a plurality of sensors 270 located within the housing 280 to measure or determine a plurality of physical attributes related to an item 290 passing through the housing 280.

The scanner 120 may suitably include a processor 205, interface circuitry 210, a memory 215, a user interface 265 and the plurality of sensors 270. The plurality of sensors 270 may suitably include a weigh scale 235, multiple cameras 240, an ultrasonic transceiver 245, an item transport 250, a metal detector 255 and a temperature sensor 260. The interface circuitry 210 provides the electronics required for the processor 205 to communicate with the memory 215, the computer network 150 and the other devices and components of the scanner 120 using a data network 230. The interface circuitry 210 generates the data network 230 that may suitably include electronics and software to generate an industry standard Universal Serial Bus (USB).

The memory 215 includes computer instructions 220 that are executed by the processor 205 which causes the processor 205 to perform the features and functions of the scanner 120. The computer instructions 220 when executed by the processor 205 further cause the processor 205 to control the devices and components of the scanner 120. In some embodiments, the memory 215 further includes a database 225 and the computer instructions 220 include instructions that when executed by the processor 205 will cause the processor 205 to implement the features and functions of a database using the database 225.

In the present embodiment, the scanner 120 includes the item identification housing 280 which includes an input portal 281 that receives items for identification and an output portal 282 where items exit from the housing 280. In other embodiments, the housing 280 takes other physical forms such as a carousel. Additionally, the location of the different devices within the housing 280 should not be understood to be fixed. The depicted locations, while functional, are presented for illustration purposes only. An item transport 250 receives items at the input portal 281 of the housing 280, transports the items through 284 the interior of the housing 280 and then outputs the items through the output portal 282. The operation of the item transport 250 is controlled by the processor 205. In some embodiments, the item transport 250 is comprised of multiple independent item transports that cooperate to move items.

The plurality of sensors 270 are used by the scanner 120 to measure or determine certain physical attributes of each item that passes through the housing 280. The output of each sensor includes data specific to the type of sensor. For example, the weigh scale 235 outputs a value that represents the weight being applied to the weigh scale 235 at a specific time, the cameras 240 produce images and the metal detector 255 produces data captured from the output of the detector coil of the metal detector 255 over a short period of time. The data produced by the sensors is further processed to obtain usable attribute data. For example, the data received from the metal detector 255 represents a reflected signal and must be processed to determine if metal has been detected.

The metal detector 255 is located within the housing 280 and detects if an item passing by the metal detector 255 on the item transport 250 is a metallic or non-metallic item. An item such as a can of vegetables will be identified as metallic because it is packaged in a metal can. However, frozen vegetables in a non-metalized plastic bag will be identified as non-metallic. To detect the presence of metal, the metal detector 255 may suitably use pulse induction technology or very low frequency (induction balance) technology or other suitable technologies.

The weigh scale 235 is located within the housing 280 and measures the weight of an item passing through the housing 280. In some embodiments, the item transport 250 is mounted on the load cells of the weigh scale 235. The load cells then measure the weight of the item transport 250 and the item on the item transport 250. The weigh scale 235 then subtracts the tare weight from the measured weight to determine the weight of the item. In other embodiments, the item transport 250 is divided into three separate and individual item transports. A first item transport brings the item into the housing 280 through the input portal 281 and deposits the item onto a second item transport. The second item transport is located within the housing 280 and is supported on the load cells of the weigh scale 235 which measures the weight of the item and the second item transport. The weigh scale 235 subtracts the tare weight from the measured weight to determine the weight of the item on the second item transport. Once the weight of the item has been determined, the second item transport moves the item to and deposits the item onto the third item transport which moves the items out of the housing 280 through the output portal 282.

The temperature sensor 260 is used to measure the temperature of an item as it passes through the housing 280. In some embodiments, the temperature sensor 260 includes an infrared non-contact temperature sensor that measures the temperature of the item from a distance. In other embodiments, the temperature sensor 260 is a far infrared array sensor that can determine temperature over a larger area instead of a single point. The temperature sensor 260 may suitably measure temperatures of items that range from 0° F. to 200° F. The measured temperature is used to determine if the item is frozen like frozen ice cream, refrigerated like milk, at room temperature like a box of cereal, or hot like a roasted chicken from the deli. For example, an item with a measured temperature at or below 30° F. is determined to be frozen. An item with a measured temperature above 30° F. but at or below approximately 55° F. is determined to be refrigerated. An item with a measured temperature above 55° F. and at or below 90° F. is determined to be at room temperature. An item with a measured temperature above 90° F. is determined to be hot. It should be noted that the range of the temperatures used to determine the temperature state for an item can be adjusted as needed. For example, in an open air environment like a farmers market, the ambient temperature might range from 40° F. to 100° F. during a 24 hour period, so continuous adjustments to the temperature ranges would be employed. One technique would measure the ambient temperature and adjust accordingly.

The ultrasonic transceiver 245 is used to determine the rigidity of an item as it passes through the housing 280. The ultrasonic transceiver 245 transmits an ultrasonic signal into the item when the item is next to the ultrasonic transceiver 245 and measures the signal reflected from the item. The measurement is used to determine the rigidity of the item. The measured rigidity is divided into three predetermined categories: 1) hard; 2) semi-soft; and 3) soft. Each of the categories causes an item to reflect a different amount of ultrasonic energy which produces a different measured response. Items with a hard rigidity will reflect the most energy and items with a soft rigidity will reflect the least energy. Semi-soft items reflect an amount of energy between the two. In other embodiments, an air puffer is used instead of the ultrasonic transceiver 245. The air puffer shoots a short micro-burst of air at the item and then measures the signature of the reflected air pressure. Different rigidities will produce different reflected air pressure signatures. In still other embodiments, an acoustic signature is captured as an item is moved onto a known surface such as a metal surface. The acoustic signature is used to determine the rigidity of the item. A can and a bag of marshmallows will have different acoustic signatures as they land of the known surface and the rigidity is then determined from the acoustic signature.

The cameras 240 include multiple cameras or image capture devices. The housing 280 includes two towers 285 located on opposite sides of the item transport 250. Each tower may suitably include multiple cameras 240. The cameras 240 in each tower 285 are aimed toward the center of the item transport 250. In some embodiments, one or both towers 285 extend over the item transport 250 and cameras 240 are in mounts therein so as to look down on and capture images of items passing by. When an item passes between the two towers 285, the cameras 240 capture image data for at least two sides of the item. In addition, the towers 285 include illumination devices to illuminate the items as they pass the towers 285. The illumination devices may suitably include LEDs and the amount of light generated by the devices is controlled by the processor 205. The towers 285 may suitably include reference marks on the sides facing the item transport 250. The reference marks on each tower are visible to cameras 240 on the opposite tower and are captured in the captured images. The reference marks may suitably be used to determine the size and shape of an item.

In some embodiments, the position of the sensors 270 and the order in which an item pass by the sensors 270 are different. In other embodiments, no housing 280 is used and the sensors 270 are in the open but the item transport 250 still moves the items past the sensors 270.

The user interface 265 is used to communicate with a person operating the scanner 120. The user interface 265 may suitably include one or more lights and/or a speaker. The processor 205 will operate the lights to communicate certain information and produce sounds through the speaker to communicate certain information audibly to the user. The sounds may suitably include human speech reproduced by the processor 205.

Figure 3:
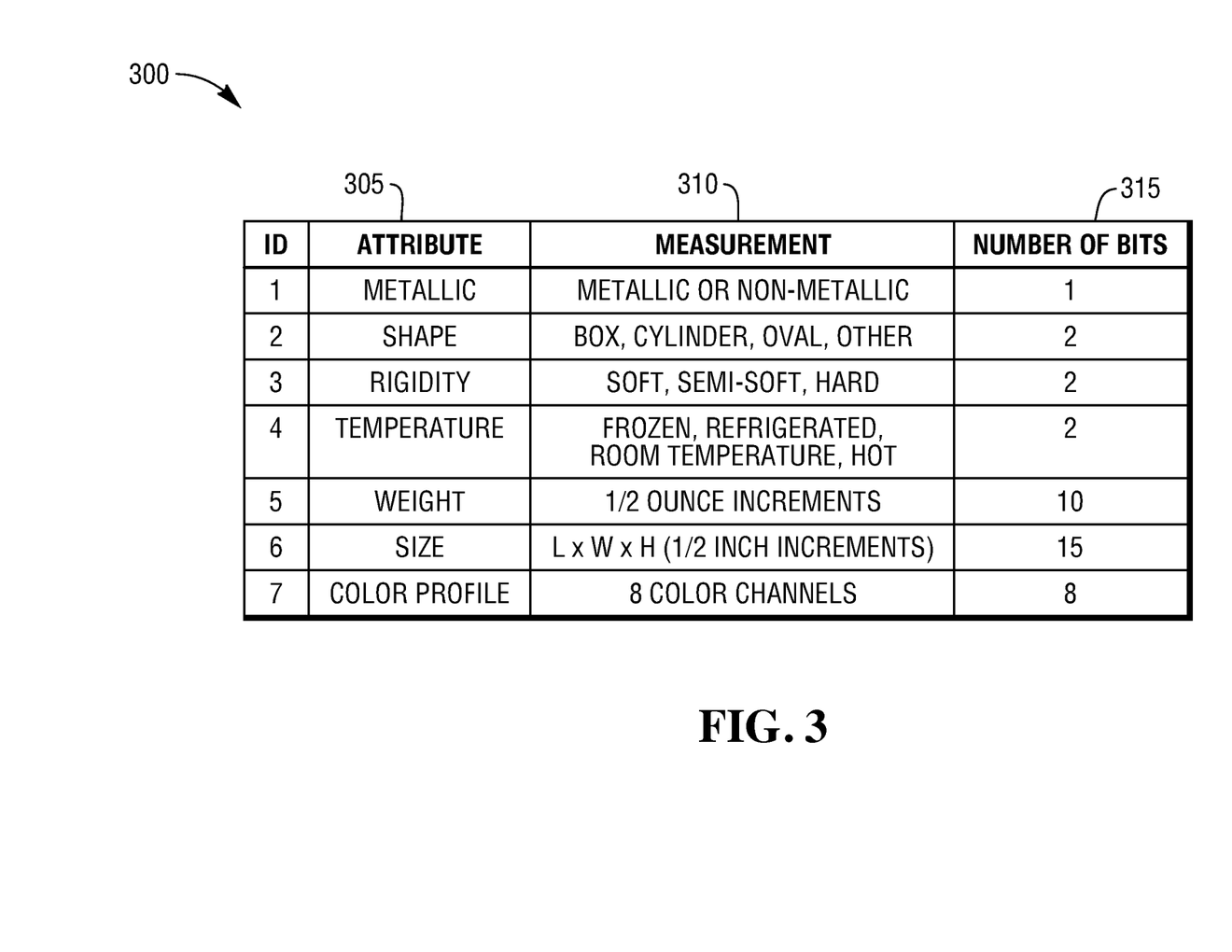
FIG. 3 provides a table listing physical attributes of an item that are measured by the scanner/scale.

FIG. 3 provides a table 300 listing physical attributes of an item that are measured or calculated by the scanner 120. The table 300 lists seven physical attributes that are named in an attribute column 305. The scanner 120 uses one or more of the sensors 270 shown in FIG. 2B to measure, calculate, or determine each of the seven physical attributes 305. Each of the sensors 270 generally produces raw data that requires additional processing by the processor 205 to achieve a measurement for one of the seven physical attributes. The measurement column 310 lists either the possible values for each physical attribute or a description of the measurement. The number of bits column 315 defines the number of computer data bits that are required to store the information that represents the measurement for each physical attribute.

Physical attribute number 1 is "Metallic". The metallic attribute is used to indicate the presence of metal in the item 290 being scanned. The scanner 120 uses the metal detector 255 sensor to scan the item 290. The processor 205 receives raw data from the metal detector 255 as the item 290 passes the metal detector 255 and processes the raw data to determine if metal is present. The measurement 310 for the metallic attribute has two predefined categories: metallic or non-metallic. Since there are only two possible categories, only one data bit is required to store the metallic attribute. In the example depicted in FIG. 2B, the item 290 being scanned is a can of beans. The can is made of metal so as the item 290 passes the metal detector 255, the metal detector 255 outputs data that indicates the presence of metal. The processor 205 receives the output data and determines after processing the data that the item 290 includes something metallic. The processor 205 then sets the value of the metallic attribute to "METALLIC". If the example item 290 had been a plastic bag of beans, no metal would have been detected by the metal detector 255 and the processor 205 would have set the value of the metallic attribute to "NON-METALLIC".

Physical attribute number 2 is "Shape". The shape attribute defines the general physical shape of the item 290. The shape attribute has four predetermined categories: box, cylinder, oval and other. The shape attribute is determined by processing one or more captured images of the item 290. The images are captured by one of the cameras 240 and the image data of the one or more images is processed by the processor 205 to determine a general geometric shape that matches one of the predefined categories. If the shape does not match a box or a cylinder or an oval, the "other" category is selected. The shape attribute requires two data bits to represent the four possible predetermined categories.

Physical attribute number 3 is "Rigidity". The rigidity attribute identifies the stiffness of the material used to package the item 290 or the components that comprise the item 290. The rigidity attribute has three predetermined categories: soft, semi-soft and hard. The rigidity attribute is measured by using the ultrasonic transceiver 245 sensor to send an ultrasonic sound wave into the item 290 and measure reflected sound wave from the item 290. Data representing the measured sound waves is processed by the processor 205 to determine which of the three predetermined categories represent the rigidity of the item 290. Since the rigidity attribute has only three predetermined categories, only two data bits are needed to represent the possible categories.

In other embodiments, an air puffer is used to determine the rigidity of the item 290. The air puffer produces focused micro-bursts of air directed at the item 290 and then measures the reflected air pressure wave to determine the rigidity of the item 290. The more rigid the item being measured, the larger the magnitude of the reflected air pressure wave.

Physical attribute number 4 is "Temperature". The temperature attribute measures the current temperature of the item 290 and assigns it to one of four predetermined categories. The categories are frozen, refrigerated, room temperature and hot. The scanner 120 used the temperature sensor 260 to read the temperature of the item 290 as it passes by the temperature sensor 260. The temperature sensor 260 is preferably a non-contact infrared temperature sensor that senses infrared energy emitted by the item 290 to determine the surface temperature of the item 290. The temperature sensor 260 outputs data that represents the measured surface temperature of the item 290. The processor 205 receives the temperature data and further processes the data to determine which of the four categories the temperature falls within. For example, the frozen category is predefined to be any temperature below 30° F. Therefore if the measured temperature is 25° F., the processor 205 will select the frozen category as the temperature attribute. Since the temperature attribute has only four categories, only two data bits are needed to represent the possible categories.

Physical attribute number 5 is "Weight". The weight attribute is a measure of the weight of the item 290. The scanner 120 uses the weigh scale 235 to determine the actual weight of the item 290. The processor 205 receives the actual weight from the weigh scale 235 which is accurate to several decimal places. The processor 205 converts the actual weight to ounces, multiplies the ounces by two and then rounds to the nearest whole number. For example, a weight of 1 lb ½ ounce is converted to 16.5 ounces which is then multiplied by two to get 33. 33 represents the number of ½ ounce increments in 1 lb ½ ounce. 10 data bits are used to store the weight attribute. This means the highest weight that can be stored is 32 lbs. This attribute does not have predefined categories but the actual weight is converted to custom units with a lower resolution than the actual weight and a maximum value of 32. It will be recognized that additional bits can be added to address larger maximum weight values or the incremental weight value can be increased from ½ ounce to 1 ounce or more to address larger maximum weight values.

Physical attribute number 6 is "Size". The size attribute is a 3 dimensional (length, width, height) measurement of the physical size of the item 290. The scanner 120 determines the size of the item 290 by processing a captured image of the item 290. The image is captured by one of the cameras 240 and the image data is processed by the processor 205 to determine the measurement for each of the three dimensions of the item 290. In some cases, additional images from other cameras 240 are required to determine the dimensions. The length of each dimension is expressed as the number of ½ inch increments that approximates the actual length. For example, a height of 5.5 inches is represented by the number 11. 15 data bits are used to store the 3 dimensions with 5 data bit used for each dimension. Therefore, the maximum length of any single dimension is 16 inches. This attribute does not have predefined categories but the actual length of each dimension is converted to custom units with a lower resolution than the actual measurement and a maximum value of 16. It will be recognized that additional bits can be added to address larger maximum length values or the incremental length value can be increased from ½ inch to 1 inch or more to address larger maximum length values.

Physical attribute number 7 is "Color Profile". The color profile attribute is a measurement of eight different color channels that are used to depict a captured image of the item 290. When an electronic image is captured by an image capture device, such as the cameras 240, the image is composed of digital data that represent the characteristics of the captured scene. The captured digital data is organized by the characteristics they represent and stored in arrays of values, also known as channels. Image standards define different image formats each of which supports one or more different channel formats. One example of a common channel format is known as "RGB" which stands for the colors red, green and blue. This format includes digital image data arranged into at least three arrays or channels with one channel for each of the three colors: red, green and blue.

In this embodiment, the color profile attribute is based on a custom channel format that uses eight color channels. The eight channels are named: dark, light, red, yellow, green, cyan, blue and magenta. The scanner 120 determines the color profile for the item 290 by capturing an image of the item 290 using one of the cameras 240. The image data is processed by the processor 205, to identify the outline of the item 290 in the image. All image data that represents a portion of the image that lies outside the outline is discarded so that the remaining image data represents just the item 290. The processor 205 then converts the format of the remaining image data to the custom eight channel image format. The image data for each channel is normalized to a 0 to 10 scale and then an average value for each channel is calculated. The average value of each channel is compared to a predetermined threshold value. A one is assigned as the attribute for each channel where the average value for the channel is equal to or above the threshold value. A zero is assigned as the attribute for each channel where the average value for the channel is below the threshold value. A single data bit is required to store the attribute for each channel which means eight data bits are needed to store the eight channels that comprise the color profile attribute.

In some embodiments, the color profile attribute for the item 290 includes a mask for each of the 8 color channels. The mask includes 1 bit for each of the 8 color channels and the mask is used to determine if the corresponding color channel will be used in the comparison process or wild carded. For example, a zero for a mask bit signifies that the value of the corresponding color channels is not used in the comparison process and a one for a mask bit signifies that the value of the corresponding color channel is used in the comparison process.

It should be noted that the details for the above attributes can be changed or modified and still be within the scope of the present invention. For example, one or more elements of the color profile can be changed or a category of an attribute can be changed, added, or deleted, or the limits of an attribute can be extended or reduced. In some embodiments, the weight increment is increased to one ounce which increases the maximum weight from 32 to 64 lbs. Some of the changes may increase the number of options and will therefore increase the number of bits required to store the possible options but the invention can be adjusted to accommodate these changes.

In the present embodiment, 40 data bits are required to store the information from the seven physical attributes. After each of the seven individual physical attributes are determined for the item 290, the processor 205 generates an aggregate attribute data record for the item 290 by combining each of the 7 physical attributes in a predetermined order. The aggregate attribute data record is then used to identify the item 290. The process starts with a universe of known item identities. The universe may suitably include as many as 100,000 possible known item candidates. The aggregate attribute data record is used to reduce the number of candidates down to just a few candidates. Additional processing using the reduced number of candidates is required to arrive at the final identify of the item 290.

The database 225 is stored in the memory 215 of the scanner 120. The database 225 comprises a plurality of data records each including an aggregate attribute data record for a known item and additional information that describes the known item or a link to additional information that describes the known item. The aggregate attribute data record is generated for the known item using the same process and the seven physical attributes described above. Most items have multiple sides or ways of viewing it. Therefore, separate records are needed for each predominate side or view. An aggregate attribute data record is generated for each record using the side or view assigned to the record. For example, a box of cereal has two predominate sides. They are the front and back sides of the box. These sides are predominate because the area of these two sides are far larger than the area of the other sides of the box. A record is created for the front side of the box that includes an aggregate attribute data record for the front side and a second record is created for the back side of the box that includes an aggregate attribute data record for the back side of the cereal box. Each record also includes additional information that identifies the known item or a link to information that identifies the known item. Using a link to the information reduces the size of the record. The information about the known item may preferably include an identification code such as a Universal Product Code (UPC) that identifies the item. The records are stored in the database 225.

The universe of known items that can be identified by the scanner 120 can include more than 100,000 items. The present invention uses an aggregate attribute data record generated for an unknown item to reduce the size of the universe of known items to only a few known items that match the attributes of the unknown item. Once the universe of known items is reduced to a small set of candidate items, additional processing is performed using just the set of candidate items to determine the actual identity of the unknown item. This processing may suitably be performed by the processor 205. The additional processing is beyond the scope of this invention. In some instances, the set of known candidate items has only one member so the unknown item is identified without the need for additional processing. However, the additional processing may suitably still be performed to confirm the identity.

In some embodiments, an $8^{th}$ physical attribute is used that is a measurement of the water content of an item 290 or if the item is a liquid. A transceiver sensor that transmits radio frequency (RF) energy into the item 290 and measure the reflected signal to determine the amount of water contained in the item 290. The attribute is has two categories, non-liquid or liquid and the reflected RF energy is used to determine which category defines the item 290.

Figure 4:
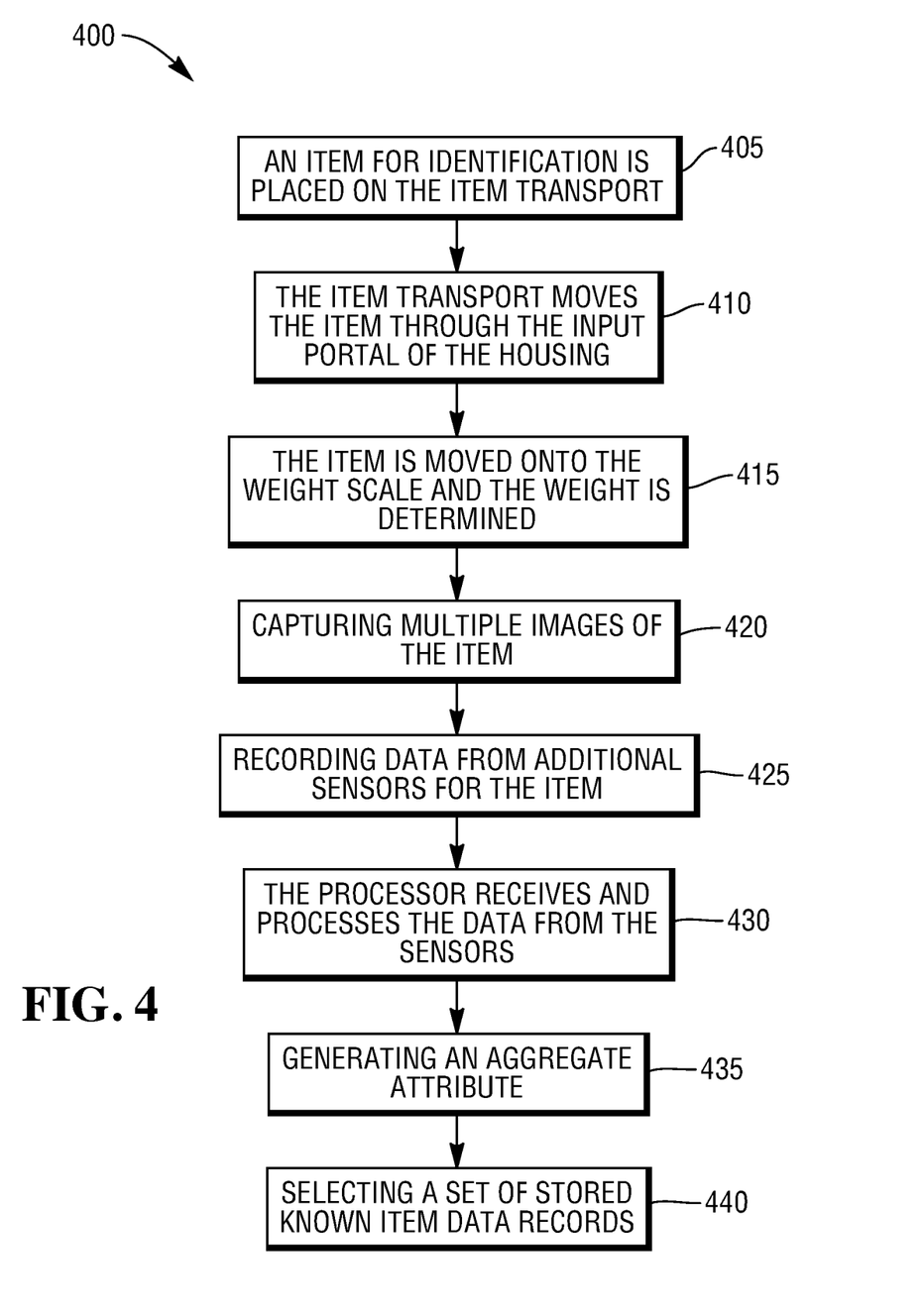
FIG. 4 is a high-level flow diagram illustrating a method of operating the scanner/scale to identify an item.

Turning now to FIG. 4, there is provided a flow diagram illustrating a method of operating the scanner 120 to identify an item. In this method 400, the item 290 is placed on the item transport 250 and moved through the input portal 281 of the housing 280 through the housing 280 and emerges from the housing 280 through the output portal 282. The item transport 250 may stop and start or even reverse to allow additional time for one or more of the plurality of sensors 270 within the housing 280 to capture data related to the item 290. While the item transport 250 is depicted as taking the item 290 on a generally straight path through the housing 280, other paths that are not straight are also envisioned. One function of the item transport 250 is to arrange the items entering the housing 280 into a single line of items with no items arranged side by side which would prevent one or more sensors 270 from being able to capture accurate data related to a single item.

As the item 290 passes through the housing 280, the plurality of sensors 270 record raw data related to the item 290. The raw data is then processed to produce values for the plurality of physical attributes listed in FIG. 3. In some embodiments, one or more sensors 270 will process the recorded raw data to produce a value. For example, the weigh scale 235 will subtract the tare weight from a measured weight and output the result which is the weight of the item on the scale. However, even though the raw data has been processed by the sensor, additional processing is still required to produce values for the plurality of physical attributes 305. The raw data or the processed data if available from each sensor is sent to the processor 205 where it is further processed to produce values for each of the plurality of physical attributes 305.

In step 405, the item 290 is placed on the item transport 250. The item 290 is part of a purchase transaction being performed by the point of sale terminal 110 and the item 290 has to be identified before it can be added to the purchase transaction. In step 410, the item transport 250 transports the item 290 into the housing 280 through the input portal 281.

In step 415, the item 290 is transported onto the weigh scale 235. The weigh scale 235 then determines the weight of the item 290 and transmits the weight of the item 290 to the processor 205. In some embodiments, the item transport 235 includes three independent sections where each section is independently controlled and mechanically isolated from the other sections but configured to move the item 290 across and between all three sections. The middle section of the item transport 250 is attached to the weighing apparatus of the weigh scale 235. In this configuration, the weigh scale 235 will weigh both the middle section of the item transport 250 and the item 290. However, the weight of the middle section of the item transport 250 is known and subtracted from the total weight to determine the weight of the item 290. To reduce vibration, the processor 205 causes the middle section of the item transport 250 to stop moving the item 290 once the item 290 is located on the weigh scale 235.

In step 420, each of the cameras 240 capture an image of the item 290. In this embodiment, the images are captured while the item 290 is still located on the weigh scale 235 and is not in motion. In some embodiments, light from a plurality of sources are aimed at the space above the weigh scale 235 to illuminate the item 290. The light sources are controlled by the processor 205 and the light emitted from the sources can be independently adjusted to a plurality of levels from off to the maximum output for each source. The captured images are transmitted to the processor 205 for additional processing to determine values for physical attributes related to the item 290. The cameras 240 are image capture devices that are designed for this single purpose and thus may not have all of the features and functions of a consumer camera.

In step 425, the remaining sensors in the plurality of sensors 270 record data about the item 290. This includes the metal detector 255 that records data that indicates the presence of metal in the item 290. The temperature sensor 260 also records a measurement for the temperature of the item 290. The ultrasonic transceiver 245 transmits ultrasonic sound waves into the item 290 and records the reflected sound waves which after additional processing will determine the rigidity of the item 290. All of the records data is transmitted to the processor 205 for additional processing to determine a value or values for physical attributes related to each sensor.

In step 430, each of the plurality of sensors 270 have recorded data related to the item 290 and transmitted the data to the processor 205 for additional processing. The processor 205 generates values for each of the plurality of physical attributes 305 listed in FIG. 3 using recorded data from one or more of the plurality of the sensors 270. The generated values conform to the measurement 310 requirements also listed in FIG. 3. The following physical attributes have values selected from a list of predetermined categories: Metallic, Shape, Rigidity, Temperature and Color Profile. For each of these physical attributes, the processor 205 processes data received from a sensor related to the physical attribute to determine a raw attribute and then selects from the predetermined categories the category defined for the raw attribute. Each of the predetermined categories may include a range of raw attributes.

For example, the temperature physical attribute has a predetermined category of "Frozen" which is defined to include all measured temperatures at or below 30° F. and the raw attribute is the measured temperature of the item 290 as measured by the temperature sensor 260. The processor 205 selects the "Frozen" category for all measured temperatures at or below 30° F. Since the temperature physical attribute has 4 predetermined categories and they are defined to cover all possible temperatures, all measured temperatures will fall into one of the predetermined categories. Using the predetermined categories reduces the number of data bits required to store information about the physical attribute and it also limits the information stored to the most pertinent information required to identify an item. The other physical attributes with predetermined categories work in a similar manner.

The weight and size physical attributes do not have predetermined categories but they do require additional processing to transform their raw data into custom data which is shown in FIG. 3 and described above.

In step 435, the processor 205 generates an aggregate attribute data record for the item 290. In this embodiment, the aggregate attribute data record has a length of 40 data bits which includes the values for each of the seven physical attributes 305. The location within the data record for each of the values for the seven physical attributes 305 is predetermined. In this embodiment, the values for each of the seven physical attributes 305 appear in the same order the attributes are listed in FIG. 3, that is the single data bit for the metallic physical attribute appears first in the aggregate attribute data record and the eight data bits for the color profile physical attribute appear last in the aggregate attribute data record.

In step 440, the processor 205 queries the database 225 to select a set of known item data records. The database 225 includes a plurality of the known item data records where each known item data record includes information defining a known item and this information includes an aggregate attribute data record generated for the known item. The database 225 may suitably include over 100,000 known item data records. The processor 205 queries the database 225 using the aggregate attribute data record for the item 290 and the database 225 returns a set of all known item data records where the aggregate attribute data record for the known item matches the aggregate attribute data record for the item 290. The returned set will generally include multiple known item data records. This is by design. One feature of the present invention is the ability to quickly and efficiently reduce a very large universe of possible identities for the item 290 to a very small set of possible identities for the item 290. The small set of possible identities is further processed using a different technique to determine which one identifies the item 290.

In the present embodiment, the database 225 is stored in the memory of the scanner 120. This is possible because the aggregate attribute data record is very memory efficient because it only requires 40 data bits of storage. The small size of the aggregate attribute data record allows a database with 100,000 known item data records to require less than 10 megabytes of data storage. However in other embodiments, the database is stored in the point of sale terminal 110 or in the store server computer 160. In these embodiments, the scanner 120 sends the aggregate attribute data record for the item 290 to the point of sale terminal 110 for identification. If the point of sale terminal 110 has the database, it performs the query of the database and returns the resulting set to the scanner 120. If the store server computer 160 has the database, the point of sale terminal 110 sends the aggregate attribute data record to the store server computer 160 to perform the query and then returns the resulting set to the scanner 120.

Although the present invention has been described with particular reference to certain preferred embodiments thereof, variations and modifications of the present invention can be effected within the spirit and scope of the following claims. For example, while particular sensors are described less or more sensors may be employed as desired for a particular context, or as new sensing technologies become cost effective. Further, while example categories are described within an attribute, it will be recognized less or more categories may be employed.

What is claimed is:

1. A computer implemented method to identify an item presented to the item scanner using physical attributes of the item, the method comprising:
calculating a value for each of a plurality of physical attributes related to the item using one or more of a plurality of sensors that are part of the item scanner;
identifying from the plurality of physical attributes the physical attributes that have predefined categories where each predefined category is based on a predetermined range of values for the physical attribute and determining for each of the identified physical attributes the predefined category that includes the calculated value;
generating an aggregate attribute data record that includes each of the plurality of physical attributes;
comparing the generated aggregate attribute data record to a plurality of the stored aggregate attribute data records for known items; and
selecting a set of stored known item data records where the stored aggregate attribute data record of each selected known item data record matches the generated aggregate attribute data record, and wherein the plurality of physical attributes includes a rigidity attribute captured by an air puffer that produces micro-bursts of air directed at the item, the rigidity attribute includes an indication of the rigidity of the item, and the indication of the rigidity includes the predetermined categories of soft, semi-soft or hard.

2. The method of claim 1, wherein each stored aggregate attribute data record is part of a known item data record and the stored aggregate attribute data record represents physical attributes of the known item and where each of the stored data records further includes information that identifies the known item.

3. The method of claim 1, wherein the plurality of physical attributes includes a metallic attribute that includes an indication of the presence of metal with the item.

4. The method of claim 1, wherein the plurality of physical attributes includes a temperature attribute that includes an indication of the temperature of the item.

5. The method of claim 4, wherein the indication of the temperature includes the predetermined categories of frozen, refrigerated, room temperature and hot.

6. The method of claim 1, wherein the plurality of physical attributes includes a color profile attribute that includes indications for 8 color channels.

7. The method of claim 1, wherein the plurality of sensors includes a sensor for detecting the presence of metal.

8. The method of claim 1, wherein the plurality of sensors includes a sensor for detecting the temperature of the item without making contact with the item.

9. The method of claim 1, wherein the plurality of sensors includes a plurality of the cameras where images captured by the plurality of cameras are processed to calculate a shape attribute, a size attribute and a color profile attribute.

10. The method of claim 1, wherein the generated aggregate attribute data record has a length equal to or of less than 8 data bytes.

11. One or more non-transitory digital storage media storing instructions which, when executed by one or more computing devices, cause performance of the method recited in claim 1.

12. An item scanner for identifying an item presented to the item scanner, the item scanner including:
- a housing including an input portal for receiving the item and an output portal for exiting the item;
- a item transport operable to transport the item through the input portal to the output portal of the housing;
- a plurality of sensors located within the housing and operable to capture information about the item as the item is transported through the housing;
- a memory including computer instructions;
- a processor in communication with memory where the computer instructions when executed by the processor cause the processor to perform functions including:
  - calculating a value for each of a plurality of physical attributes related to the item using information captured by one or more of the plurality of sensors where a portion of the plurality of physical attributes include predefined categories and the value for these physical attributes include a predefined category; and
  - selecting data identifying each of a set of known items where values for each of the plurality of physical attributes related to the known items matches the corresponding value for each of the plurality of physical attributes related to the item, and wherein the plurality of the physical attributes includes a rigidity attribute and wherein the plurality of sensors include an air puffer operable to determine a rigidity value for the item which is processed by the processor to select a category from a set of predetermined rigidity categories, the air puffer directing micro-bursts of air at the item.

13. The item scanner of claim 12, wherein the plurality of the physical attributes includes a weight attribute and wherein the plurality of sensors include a weigh scale that is operable to determine the weight of the item which is processed by the processor to obtain the weight attribute.

14. The item scanner of claim 12, wherein the plurality of the physical attributes includes a shape attribute, a size attribute and color profile attribute and wherein the plurality of sensors include a plurality of cameras operable to capture images of the item where the images are processed by the processor to obtain values for the shape, size and color profile attributes.

15. The item scanner of claim 14, wherein the color profile attribute includes data 8 color channels.

16. The item scanner of claim 12, wherein the plurality of the physical attributes includes a metallic attribute and the plurality of sensors include a metal detector operable to determine the presence of metal associated with the item and to produce an indication that is processed by the processor to obtain a value for the metallic attribute.

17. The item scanner of claim 12, wherein the plurality of the physical attributes includes a temperature attribute and wherein the plurality of sensors include a non-contact temperature sensor operable to determine the temperature of the item at a distance from the item where the temperature of the item is processed by the processor to select a category from a set of predetermined temperature categories that together cover the range of possible temperatures.

* * * * *